United States Patent
Steinberger et al.

(10) Patent No.: US 11,139,622 B2
(45) Date of Patent: Oct. 5, 2021

(54) HYBRID BUSBAR FOR A BUSBAR SYSTEM

(71) Applicant: WOEHNER BESITZ GMBH, Roedental (DE)

(72) Inventors: Philipp Steinberger, Coburg (DE); Hubert Lenker, Sonneberg (DE); Joram Masel, Kueps-Oberlangenstadt (DE)

(73) Assignee: WOEHNER BESITZ GMBH, Rödental (DE)

( * ) Notice: Subject to any disclaimer, the term of this patent is extended or adjusted under 35 U.S.C. 154(b) by 0 days.

(21) Appl. No.: 15/733,558

(22) PCT Filed: Mar. 11, 2019

(86) PCT No.: PCT/EP2019/055981
§ 371 (c)(1),
(2) Date: Aug. 27, 2020

(87) PCT Pub. No.: WO2019/175087
PCT Pub. Date: Sep. 19, 2019

(65) Prior Publication Data
US 2020/0412074 A1 Dec. 31, 2020

(30) Foreign Application Priority Data
Mar. 15, 2018 (EP) ..................... 18162101

(51) Int. Cl.
*H01R 4/24* (2018.01)
*H01R 25/14* (2006.01)
(Continued)

(52) U.S. Cl.
CPC ............. *H01R 25/145* (2013.01); *H01R 4/38* (2013.01); *H01R 25/14* (2013.01); *H02B 1/21* (2013.01); *H02G 5/04* (2013.01); *H02G 5/06* (2013.01)

(58) Field of Classification Search
CPC ...... H01R 4/2433; H01R 4/2408; H01R 4/44; H01R 13/8219; H01R 4/363; H01R 13/7073
(Continued)

(56) References Cited

U.S. PATENT DOCUMENTS 3,727,171 A * 4/1973 Coles ................... H01R 4/34
439/110
9,515,397 B2 * 12/2016 Buettner .............. H01R 9/2675
(Continued)

FOREIGN PATENT DOCUMENTS

| CN | 202 759 120 U | 2/2013 |
| CN | 103444000 A | 12/2013 |

(Continued)

OTHER PUBLICATIONS

International Search Report corresponding to international application No. PCT/EP2019/055981 dated May 9, 2019, (13 pages).
(Continued)

*Primary Examiner* — Phuong Chi Thi Nguyen
(74) *Attorney, Agent, or Firm* — Maginot, Moore & Beck LLP

(57) ABSTRACT

A hybrid busbar (1) for a busbar system, said hybrid busbar (1) comprising a current carrying rail profile (2) adapted to carry an electrical current with a predefined high current amplitude and at least one contact receiving rail profile (3) having a plurality of equally spaced contact openings (4) configured to receive protruding electrical contacts (6) of electrical devices (ED-A) to be connected to said busbar system, wherein the current carrying rail profile (2) and the contact receiving rail profile (3) are connected with each other to form said hybrid busbar (1) providing at least one bounding geometry with a rectangular cross section (CS), wherein the hybrid busbar (1) can be engaged from behind (Continued)

by hook-shaped mounting latches (7) of electrical devices (ED-B) to be connected to said busbar system.

18 Claims, 16 Drawing Sheets

(51) Int. Cl.
*H01R 4/38* (2006.01)
*H02G 5/04* (2006.01)
*H02B 1/21* (2006.01)
*H02G 5/06* (2006.01)

(58) Field of Classification Search
USPC ....... 439/402, 411, 781, 271, 413, 521, 811, 439/892
See application file for complete search history.

(56) References Cited

U.S. PATENT DOCUMENTS

| | | |
|---|---|---|
| 2012/0264327 A1 | 10/2012 | Carnevale et al. |
| 2015/0111426 A1* | 4/2015 | Buettner .................. H02B 1/06 439/607.01 |
| 2020/0412074 A1* | 12/2020 | Steinberger .............. H02B 1/14 |
| 2021/0006047 A1* | 1/2021 | Masel .................... H01R 25/14 |

FOREIGN PATENT DOCUMENTS

| | | |
|---|---|---|
| DE | 41 09 040 A1 | 9/1992 |
| EP | 3 136 524 A1 | 3/2017 |
| WO | 2016156423 A1 | 10/2016 |

OTHER PUBLICATIONS

Office Action in Chinese Application No. 201980019559, dated Jun. 3, 2021.

* cited by examiner

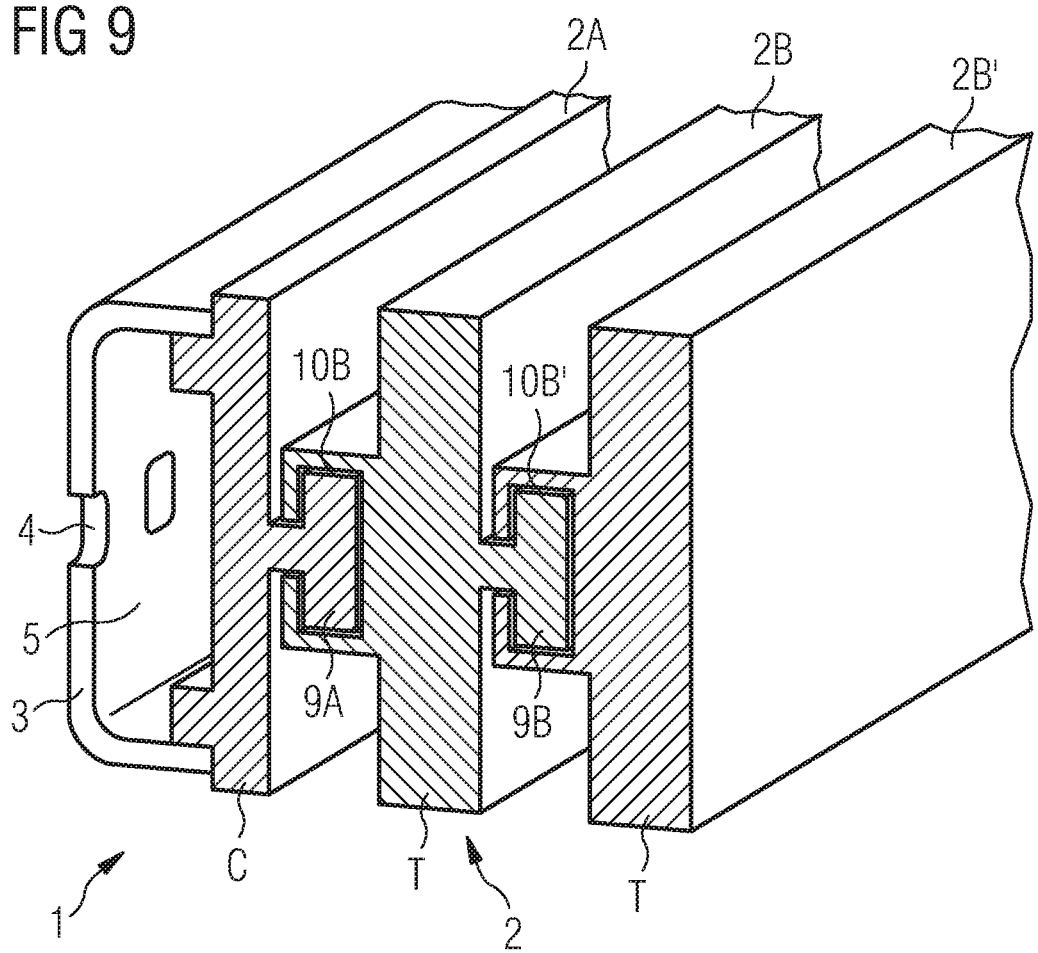

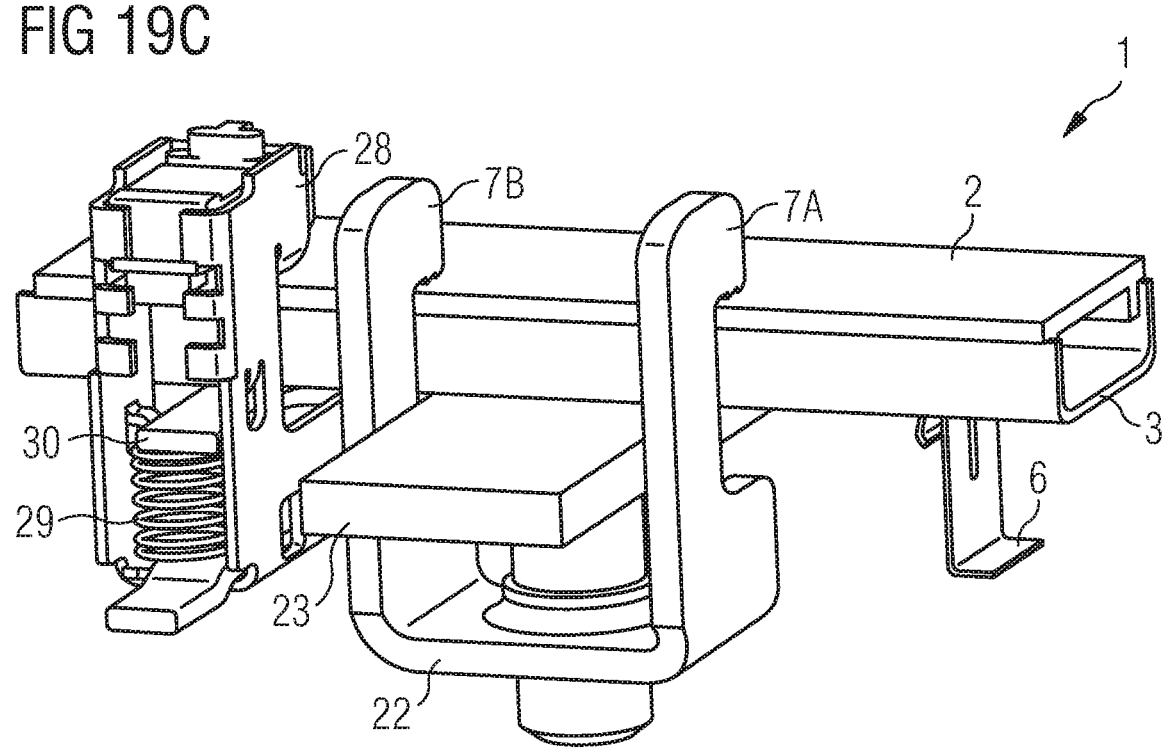

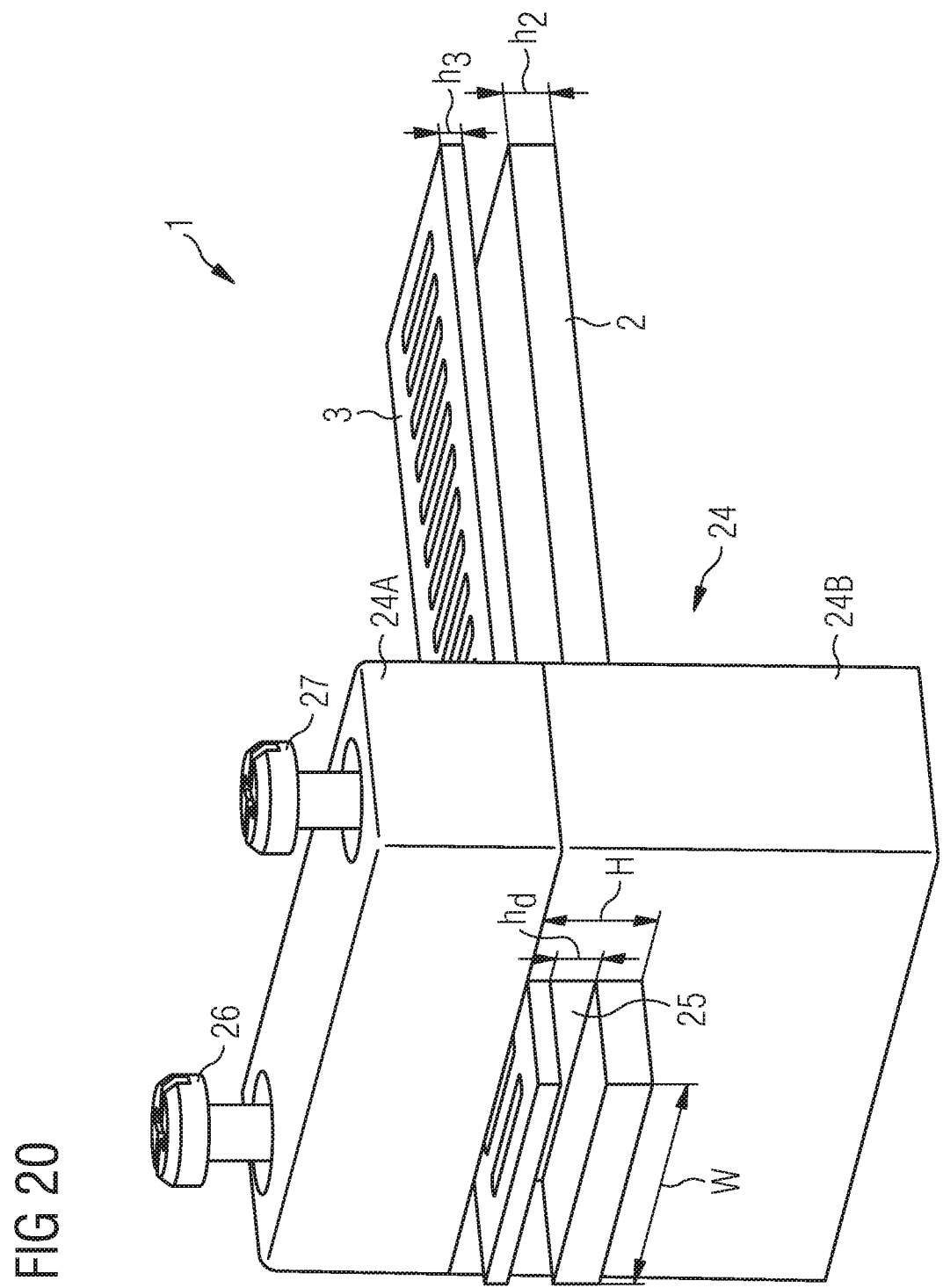

HYBRID BUSBAR FOR A BUSBAR SYSTEM

PRIORITY CLAIM

This application is a 35 U.S.C. 371 National Stage application of PCT/EP2019/055981, filed Mar. 11, 2019, and claims priority to European Application No. EP 18162101.2 filed on Mar. 15, 2018. The entire contents of the above-mentioned patent applications are incorporated herein by reference as part of the disclosure of this U.S. application.

BACKGROUND

The invention relates to a hybrid busbar of a busbar system which can be used flexibly for a wide variety of use cases.

Busbar systems can comprise one or several busbars for providing power supply for electrical devices. In conventional busbar systems, electrical devices are directly connected to the busbar system by means of adapters mounted to different busbars of the busbar system. Busbars can for example carry one or several AC mains power supply voltages. The busbars can also be used to carry DC voltages. One or more busbars can be mounted in parallel and can carry different phases L1, L2, L3 of a power supply system. An electrical device which requires electrical power supply can be connected to the busbars carrying the AC mains power supply voltages by means of clamps and conductors or by specific adapters.

Accordingly, it is an object of the present invention to provide a hybrid busbar for a busbar system which allows mounting electrical devices on a busbar system without use of any additional adapter elements.

This object is achieved by a hybrid busbar for a busbar system comprising the features of claim 1.

The invention provides according to a first aspect a hybrid busbar for a busbar system, said hybrid busbar comprising a current carrying rail profile adapted to carry an electrical current with a predefined high current amplitude and at least one contact receiving rail profile having a plurality of equally spaced contact openings configured to receive electrical contacts of electrical devices to be connected to said busbar system, wherein the current carrying rail profile and the contact receiving rail profile are connected with each other to form said hybrid busbar which is engageable from behind by hook-shaped mounting latches of electrical devices to be connected to said busbar system.

The hybrid busbar according to the first aspect of the present invention comprises in a possible embodiment at least one bounding geometry with a rectangular cross section engageable by hook-shaped mounting latches of electronic devices to be connected to said busbar system.

The hybrid busbar according to the first aspect of the present invention provides has the advantage that a first type of electrical devices having protruding electrical contacts can be inserted into the equally spaced contact openings of the contact receiving rail profile without any use of adapter elements from the front side of the busbar system.

The hybrid busbar according to the first aspect of the present invention further has the advantage that another type of electrical devices which do not comprise protruding electrical contacts can also be mounted to the same hybrid busbar using hook-shaped mounting latches of the respective electrical device.

Consequently, the hybrid busbar for a busbar system according to the first aspect of the present invention as defined by claim 1 is very flexible in use and is adapted to be connected to a first type of electrical devices with protruding electrical contacts and/or with a second type of electrical devices with hook-shaped mounting latches at the same time.

The hybrid busbar according to the first aspect of the present invention as defined by claim 1 has the further advantage that the hybrid busbar can carry currents with high current amplitudes.

In a possible embodiment of the hybrid busbar according to the first aspect of the present invention, the current carrying rail profile comprises a rail profile consisting of copper, aluminium or multi-component materials. The base materials can be coated with tin, silver, nickel, etc. or can be not coated.

In a further possible embodiment of the hybrid busbar according to the first aspect of the present invention, the contact receiving rail profile is made of copper, tin-coated copper, silver-coated copper and/or brass.

In a still further possible embodiment of the hybrid busbar according to the first aspect of the present invention, the rectangular cross section has a width W between 12 mm and 30 mm and a height H of 5 mm or 10 mm.

In a further possible embodiment of the hybrid busbar according to the first aspect of the present invention, the contact openings of the contact receiving profile comprise different shapes including rectangular contact slots, quadratic contact openings and round contact openings.

In a further possible embodiment of the hybrid busbar according to the first aspect of the present invention, the contact receiving rail profile is U-shaped.

In a still further possible alternative embodiment of the hybrid busbar according to the first aspect of the present invention, the contact receiving rail profile is flat.

In a further possible embodiment of the hybrid busbar according to the first aspect of the present invention, the contact receiving rail profile is connected to the current carrying rail profile by force fit connection to form said hybrid busbar with the rectangular cross section. For instance, the contact receiving rail profile can be pressed on the current carrying rail profile.

In a still further possible embodiment of the hybrid busbar according to the first aspect of the present invention, the contact receiving rail profile is connected to the current carrying rail profile by a materially bonded connection to form said hybrid busbar with the rectangular cross section. For instance, the contact receiving rail profile and the current carrying rail profile can be welded or glued together.

In a still further possible embodiment of the hybrid busbar according to the first aspect of the present invention, the current carrying rail profile comprises a groove to insert the contact receiving rail profile into the current carrying rail profile to form said hybrid busbar.

In a still further possible embodiment of the hybrid busbar according to the first aspect of the present invention, the contact receiving rail profile and/or the current carrying rail profile are at least partially covered with an electrical isolating layer.

In a possible embodiment of the hybrid busbar according to the first aspect of the present invention, the electrical isolating layer comprises plastic material.

In a still further possible embodiment of the hybrid busbar according to the first aspect of the present invention, the cross section of said current carrying rail profile is configured to carry an alternating or direct current with a predefined high current amplitude of up to 5000 A.

In a further possible embodiment of the hybrid busbar according to the first aspect of the present invention, the current carrying rail profile comprises a C-shaped profile and one or more T-shaped profiles or profile combined out of T and C profiles.

In a still further possible embodiment of the hybrid busbar according to the first aspect of the present invention, the current carrying rail profile comprises several T-shaped profile elements stacked on each other forming a fitting current cross section to carry the electrical current with the predefined high current amplitude.

The invention further provides according to a second aspect an electrical isolating unit for a busbar system comprising the features of claim 18.

The invention provides according to the second aspect an electrical isolating unit for a busbar system comprising a front section having equally spaced contact openings aligned with equally spaced contact openings of contact receiving rail profiles forming part of hybrid busbars according to the first aspect of the present invention enclosed by said electrical isolating unit.

DESCRIPTION OF THE FIGURES

In the following, possible embodiments of the different aspects of the present invention are de-scribed in more detail with reference to the enclosed figures.

FIG. 9 shows a further exemplary embodiment of a hybrid busbar with C-shaped and T-shaped profile elements;

FIGS. 19A,19B,19C illustrate the attachment of devices to a hybrid busbar according to the first aspect of the present invention;

FIG. 20 shows an exemplary mechanical connection element used for a hybrid busbar.

DETAILED DESCRIPTION

Figure 1:
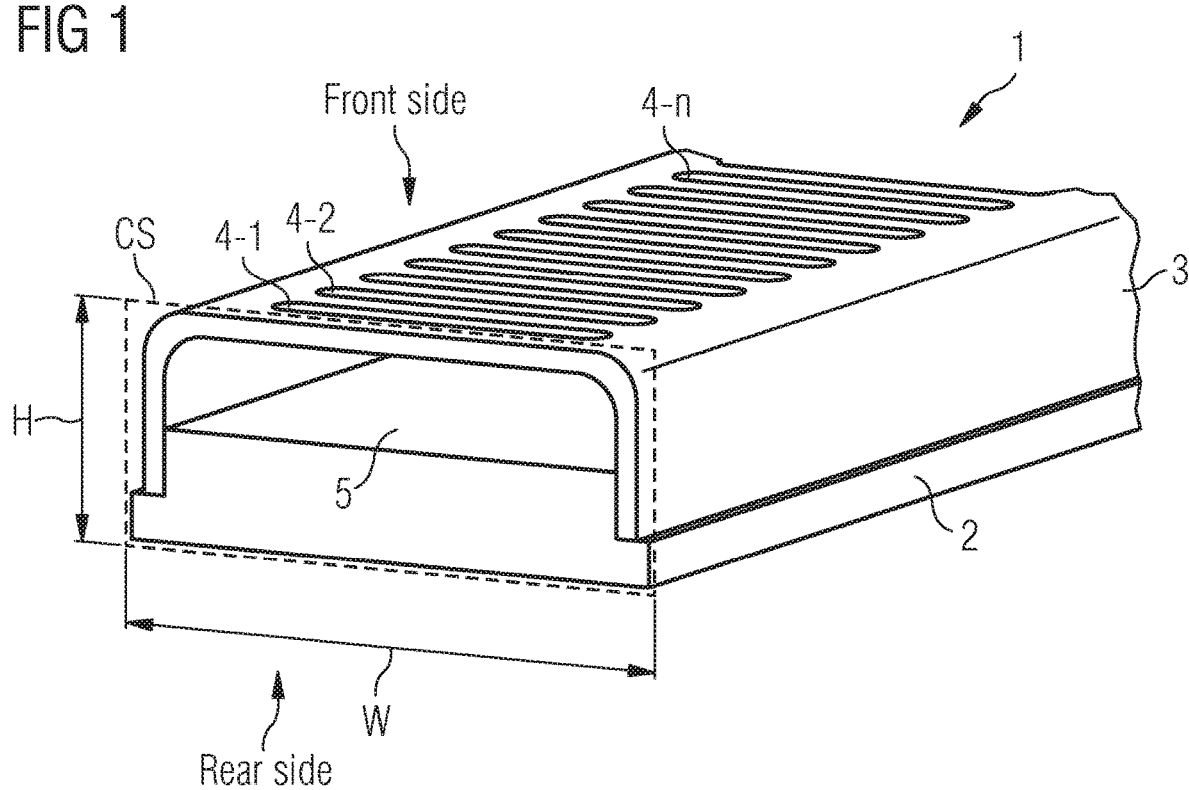
FIG. 1 shows a schematic diagram for illustrating a possible exemplary embodiment of a hybrid busbar according to the first aspect of the present invention.

As can be seen in the perspective view of FIG. 1, a hybrid busbar 1 which can be used in a busbar system comprises in the illustrated exemplary embodiment two main components or elements. The hybrid busbar 1 includes in the illustrated embodiment a current carrying rail profile 2 and a contact receiving rail profile 3. The current carrying rail profile 2 is adapted to carry an electrical current I with a predefined high current amplitude A. The contact receiving rail profile 3 has a plurality of equally spaced contact openings 4-1, 4-2 . . . 4-$n$ configured to receive protruding electrical contacts of electrical devices (not shown in FIG. 1) to be connected to the busbar system. As can be seen in FIG. 1, the current carrying rail profile 2 and the contact receiving rail profile 3 are connected with each other to form the hybrid busbar 1 having at least one rectangular cross section. The rectangular cross section of the hybrid busbar 1 has a rectangular envelope cross section CS surrounding the current carrying rail profile 2 and the at least one contact receiving rail profile 3 as illustrated in FIG. 1.

The hybrid busbar 1 can be contacted from the front side by electrical devices ED-A having protruding electrical contacts. These protruding electrical contacts of the electrical devices ED can be inserted into the contact openings 4-$i$ to make a mechanical and electrical contact with the busbar system 1. This is also illustrated schematically in the cross section CS of FIG. 2.

Figure 3:
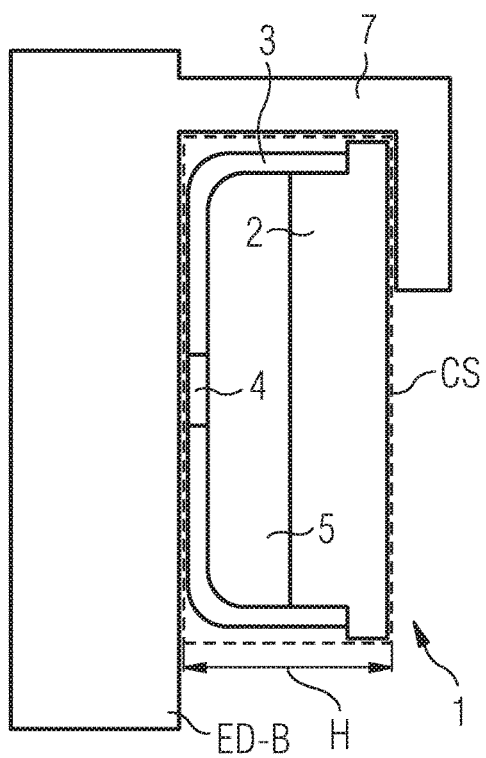

The hybrid busbar 1 of the busbar system as shown in FIG. 1 can also be engaged from behind by hook-shaped mounting latches of other electrical devices ED-B to be connected to said busbar system 1 as also illustrated in the cross section of FIG. 3.

Accordingly, the hybrid busbar 1 as shown in FIG. 1 can be contacted by two different types of electrical devices ED, i.e. a first type of electrical devices ED-A having protruding electrical contacts and a second type of electrical devices ED-B comprising hook-shaped mounting latches as shown in FIG. 3. Consequently, the hybrid busbar 1 or busbar system as shown in FIG. 1 can be used for a wide variety of different electrical devices ED and is very flexible in use. Further, the mounting of electrical devices ED to the hybrid busbar 1 as shown in FIG. 1 can be done without use of any adapter elements.

The current carrying rail profile 2 can comprise in a possible embodiment an extruded rail profile. The extruded rail profile 2 can consist of different materials including copper, aluminium or two-component materials including copper and aluminium. Further, the contact receiving rail profile 3 can also be made of different materials including copper, zinc-coated copper, silver-coated copper and/or brass. The contact receiving rail profile 3 and the current carrying rail profile 2 can further in a possible embodiment be covered at least partially with an electrical isolating material such as a plastic material. This increases the safety of an operator during the operation of the busbar system.

The rectangular envelope cross section CS illustrated in FIG. 1 can comprise in a possible embodiment a predefined width W and a predefined height H. In a possible embodiment, the width W of the rectangular envelope cross section CS is between 12 mm and 30 mm. Further, the height H of the rectangular envelope cross section CS can in a possible embodiment be 5 mm or 10 mm. Accordingly, the rectangular envelope cross section CS can comprise in a possible implementation the following dimensions: 10×12 mm, 10×20 mm, 10×24 mm, 10×30 mm. In a further implementation, the rectangular envelope cross section CS of the hybrid busbar 1 as shown in FIG. 1 can comprise the following dimensions: 5×12 mm, 5×20 mm, 5×24 mm, 5×30 mm. Consequently, the hybrid busbar 1 as shown in FIG. 1 is compatible with existing busbar systems.

The contact openings 4-*i* of the contact receiving profile 3 are configured to be equidistant thus forming a contact receiving grid. Moreover, the contact openings 4-*i* of the contact receiving profile 3 can comprise different shapes including rectangular contact slots (as illustrated in FIG. 1), quadratic contact openings and round contact openings. The shape of the contact openings 4-*i* can vary depending on the use case and the form and shape of the protruding electrical contacts of the respective electrical devices ED.

Figure 2:
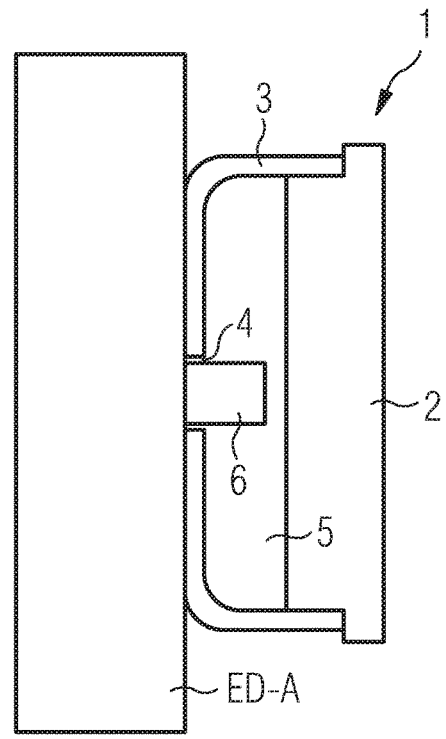
FIGS. 2, 3 illustrate cross sections to a hybrid busbar to which different types of electrical devices can be connected.
Figure 12:
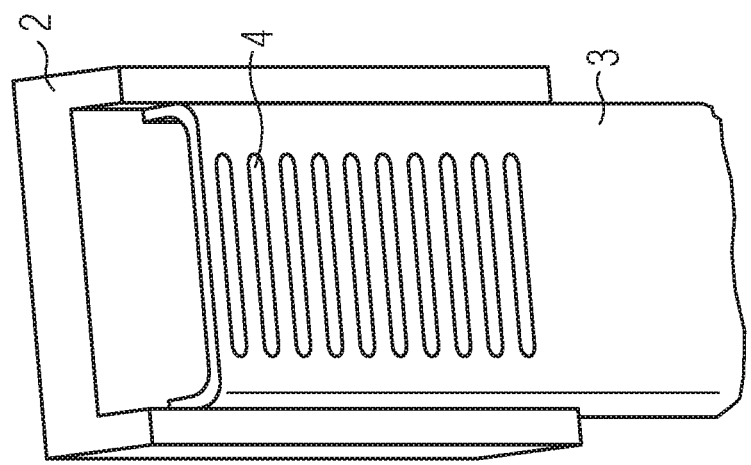
FIGS. 10, 11, 12 show further exemplary embodiments of hybrid busbars according to the first aspect of the present invention for comparatively low current amplitudes.
Figure 11:
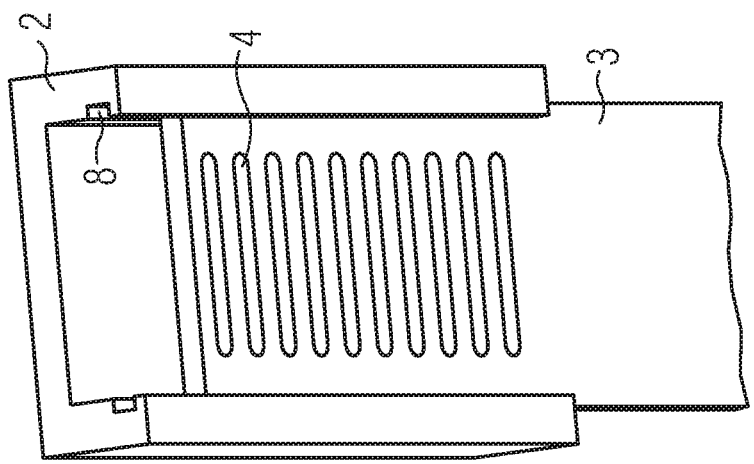
Figure 10:
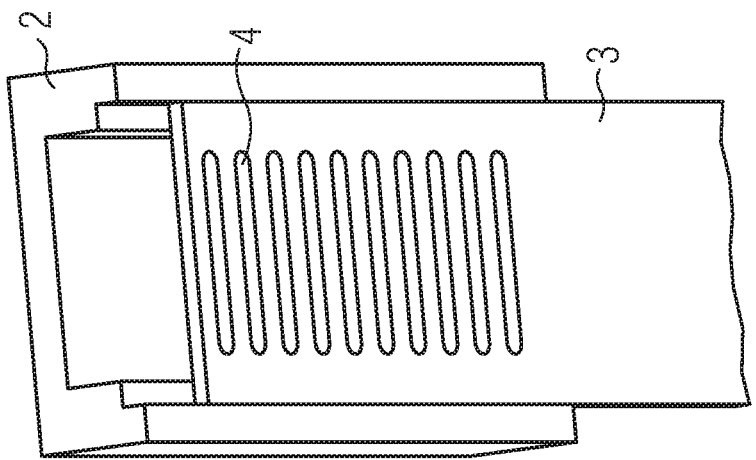

In the illustrated embodiment of FIG. 1, the contact receiving rail profile 3 is U-shaped. Between the U-shaped contact receiving rail profile 3 and the current carrying rail profile 2, there is an empty space 5 or chamber which allows inserting protruding electrical contacts from an electrical device ED through the contact openings 4-*i* to establish a mechanical and electrical connection with the hybrid busbar 1 and the corresponding busbar system. The height and size of the chamber 5 for receiving the protruding electrical contacts as illustrated in FIG. 2 can vary depending on the used electrical devices ED and the form and shape of their protruding electrical contacts. In an alternative embodiment, the contact receiving rail profile 3 is not U-shaped as illustrated in FIG. 1 but can be formed as a flat current carrying rail profile 2 as also illustrated in the embodiments of FIGS. 10, 11, 12.

There are different possible ways to connect the current carrying rail profile 2 mechanically with the contact receiving rail profile 3. In a possible embodiment, the contact receiving rail profile 3 can be pressed on the current carrying rail profile 2 to form the hybrid busbar 1 with the rectangular envelope cross section CS as illustrated in FIG. 1. In an alternative embodiment, the contact receiving rail profile 3 and the current carrying rail profile 2 can be welded together to form the hybrid busbar 1 with the rectangular envelope cross section CS. In an alternative embodiment, the contact receiving rail profile 3 and the current carrying rail profile 2 can also be glued together to form the hybrid busbar 1. The contact receiving rail profile 3 and the current carrying rail profile 2 are mechanically attached to each other. In a preferred embodiment, the contact receiving rail profile 3 and the current carrying rail profile 2 of the hybrid busbar 2 are mechanically attached to each other such that they cannot easily be separated by mechanical force.

In a possible embodiment, the current carrying rail profile 2 comprises a groove 8 to insert the contact receiving rail profile 3 into the current carrying rail profile 2 to form the hybrid busbar 1. An exemplary embodiment of a current carrying rail profile 2 having a groove to insert the contact receiving rail profile 3 is illustrated for example in FIG. 7.

Figure 8:
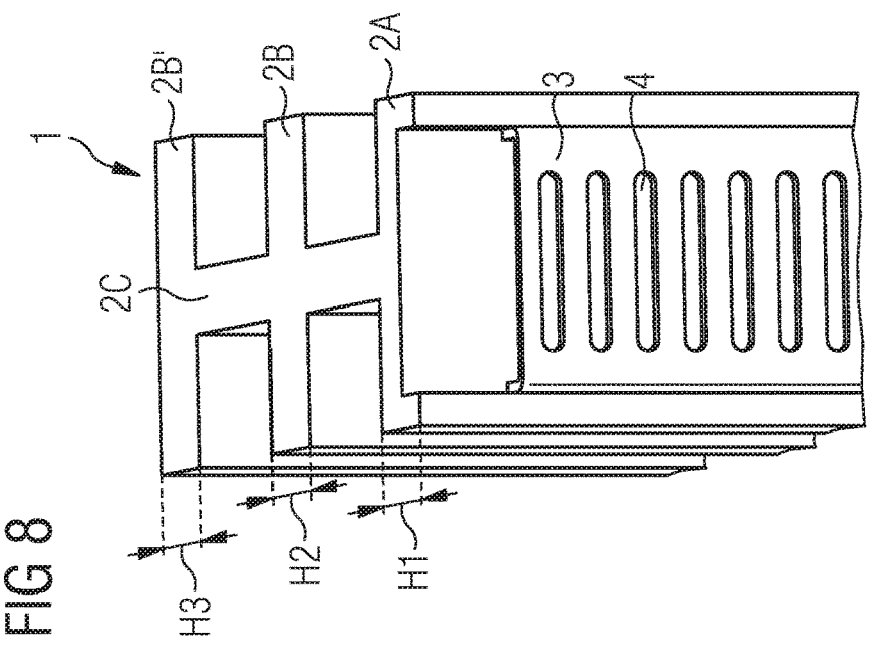
FIGS. 6, 7, 8 illustrate further possible exemplary embodiments with a current rail profiles with T-C and T-T-C shape of a hybrid busbar according to the first aspect of the present invention which can be used for high current amplitudes.
Figure 7:
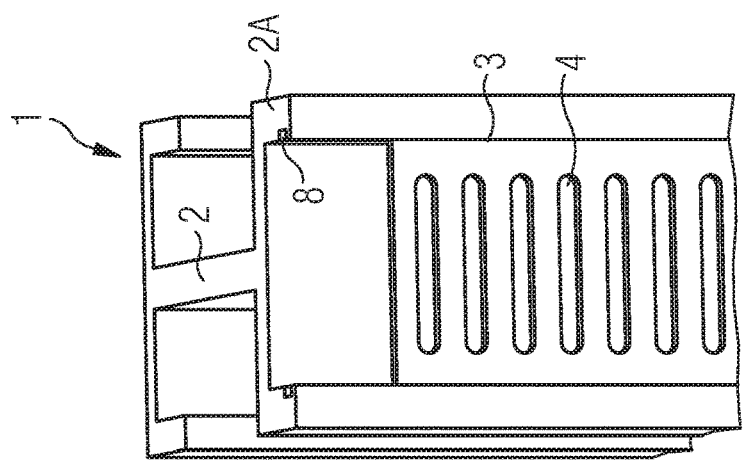
Figure 6:
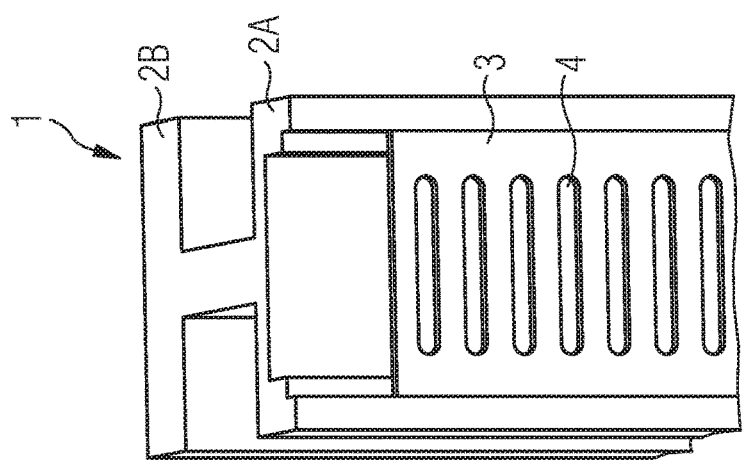

An advantage of the hybrid busbar 1 according to the present invention is that the cross section and size of the current carrying rail profile 2 defines a current amplitude A which can be carried by the hybrid busbar 1. Most of the electrical current I running through the hybrid busbar 1 is carried by the current carrying rail profile 2. Only a comparatively slow portion of the electrical current I is carried by the contact receiving rail profile 3. Consequently, the size and shape of the current carrying rail profile 2 defines a maximum amplitude of electrical current I which can flow through the hybrid busbar 1 of the busbar system. In a first possible embodiment, the current carrying rail profile 2 is mechanically connected to the contact receiving rail profile 3 in such a way that only a very high mechanical force can separate the two elements of the hybrid busbar 1 from each other. In an alternative embodiment, the current carrying rail profile 2 and the contact receiving rail profile 3 can be separated from each other, for instance to replace an existing current carrying rail profile 2 by a new current carrying rail profile 2' having a different shape or cross section. For instance, the hybrid busbar 1 as illustrated in the embodiments of FIGS. 6, 7, 8 comprise current carrying rail profiles 2 with a capability to carry a predefined current I with a very high current amplitude A. As illustrated in the embodiment of FIG. 7, the current carrying rail profile 2 may comprise a groove 8 to insert at least one contact receiving rail profile 3. For instance, if the electrical current I carried by the current carrying rail profile 2 shown in FIG. 7 is still not sufficient for the busbar system 1, a user may replace the current carrying rail profile 2 shown in FIG. 7 by another current carrying rail profile 2' having an even higher cross section and being able to carry a current I with an even higher current amplitude A. For instance, the current carrying rail profile 2 shown in the embodiment of FIG. 8 is able to carry an electrical current I with an even higher amplitude A when compared to the embodiment of FIG. 7. In the embodiment of FIG. 8, the current carrying rail profile 2 does not have a groove 8 to insert a contact receiving rail profile 3. However, in a possible embodiment, also the embodiment of FIG. 8 may comprise on the front side, i.e. at its C-shaped front element, a groove 8 to insert a flat current carrying rail profile 2 as shown in FIG. 7. The embodiment comprising a current carrying rail profile 2 with at least one groove 8 to insert one or more contact receiving rail profiles 3, in particular flat contact receiving rail profiles, has the advantage that the cross section CS and current transportation capability of the hybrid busbar 1 can be adapted to the respective use case by exchanging the current carrying rail profile 2 according to the needs of the system 1. In an alternative embodiment, the current carrying rail profile 2 and the contact receiving rail profile 3 cannot be separated and form an integral hybrid busbar 1.

In a further possible embodiment of the hybrid busbar 1 as shown in FIG. 1, a current carrying rail profile 2 comprises a C-shaped profile and one or more T-shaped profiles. For instance, the embodiments illustrated in FIGS. 6, 7, 8 show a current carrying rail profile 2 having on the front side of the system a first C-shaped profile section to which one or more T-shaped profile sections are integrally formed.

In a still further possible embodiment of the hybrid busbar 1, the current carrying rail profile 2 comprises several T-shaped profile elements stacked on each other forming a fitting current cross section to carry the electrical current I with a predefined high current amplitude A. A possible implementation of this embodiment of a hybrid busbar 1 is illustrated in FIG. 9.

FIGS. 2, 3 show possible mounting alternatives for electrical devices ED to be connected to a hybrid busbar 1 according to the first aspect of the present invention. As can be seen in FIG. 2, electrical device ED-A comprises one or more protruding electrical contacts 6 which can be inserted into corresponding equally spaced contact openings 4 of the contact receiving rail profile 3. The electrical contacts 6 are configured to establish an electrical connection between an electrical circuit within the electrical device ED-A and the busbar system. For instance, an integrated electrical circuit within the electrical device ED-A may receive AC mains voltage L via the electrical contact 6. In another possible embodiment, the electrical contact 6 can be used to supply a DC power supply voltage or current to integrated electrical circuits within the electrical device ED-A. As can be seen in FIG. 2, the electrical device ED-A can be easily mounted to the hybrid busbar 1 of the busbar system from the front side of the hybrid busbar 1 by inserting its protruding electrical contact 6 in corresponding contact openings 4 of the contact receiving rail profile 3. In a possible embodiment, the electrical device ED-A can be set on the front surface of the contact receiving rail profile 3 and can be pressed against the profile such that the protruding electrical contacts 6 are guided through the contact openings 4 to establish an electrical and mechanical connection. In a possible embodiment, the electrical contact 6 of the electrical device A can be protected on both sides by a pair of protection ribs (not shown). The protection ribs can on the one hand protect the intermediate electrical contact 6 against mechanical deformation and can additionally provide mechanical support of the electrical device ED-A mounted on the contact receiving rail profile 3. The number of electrical contacts 6 of an electrical device such as electrical device ED-A can vary depending on the use case.

In a possible embodiment, the electrical device ED-A such as illustrated in FIG. 2 can receive one or more power supply voltages or electrical currents from the hybrid busbar 1 of the busbar system. In an alternative embodiment, the electrical device ED-A can also comprise a device to feed an electrical power into the busbar system. The hybrid busbar 1 as shown in FIGS. 1, 2, 3 can be used in a preferred embodiment to carry AC or DC power supply currents. In a still further embodiment, the hybrid busbar 1 can also be used to carry communication signals within the busbar system. In a possible embodiment, the electrical device ED can comprise on one side of its housing an AC interface with electrical contacts 6 configured to establish an electrical connection with the hybrid busbar 1 of the busbar system to receive AC mains voltages L which can be converted by an integrated AC/DC power conversion unit of the electrical device ED-A into a DC power supply voltage applied to at least one DC interface of the electrical device ED-A. The electrical contacts 6 of the AC interface can be configured to be inserted into matching contact openings 4.

As can be seen in the diagram illustrated in FIG. 3, another type of electrical device ED which does not comprise protruding electrical contacts 6 on one side of its housing can also be connected to the hybrid busbar 1 according to the first aspect of the present invention. In the illustrated schematic diagram of FIG. 3, the electrical device ED-B comprises hook-shaped mounting latches 7 which can be engaged from behind on the rectangular envelope cross section CS of the hybrid busbar 1 to make an electrical and/or mechanical connection with the busbar system.

As can be seen from the embodiments illustrated in FIGS. 2, 3, the hybrid busbar 1 according to the first aspect of the present invention can be used for different types of electrical devices, i.e. electrical devices ED-A with protruding electrical contacts 6 as illustrated in FIG. 2 and/or with electrical devices ED comprising for instance hook-shaped mounting latches 7. As can be seen in FIG. 3, the shape of the mounting latches 7 is fitting to the height H of the hybrid busbar 1. In the implementation shown in FIG. 3, the electrical device ED-B may comprise electrical contacts 6 on the inner surface of the protruding hook-shaped mounting latch 7 pressed against the surface of the current carrying rail profile 2. In an alternative embodiment, the electrical device ED-B can also comprise electrical contacts 6 which are pressed against the surface of the current carrying rail profile 3. In a still further possible embodiment, the electrical device ED-B comprises electrical contacts 6 which are pressed on the surface of the current carrying rail profile 2 and/or on the surface of the contact receiving rail profile 3.

Electrical devices ED-A, ED-B illustrated in FIGS. 2, 3 can be connected side by side on the same hybrid busbar 1. Depending on the size and length of the hybrid busbar 1, a plurality of different electrical devices ED-A, ED-B can be connected to the hybrid busbar 1. No adapting means are required for the connection.

Figure 4:
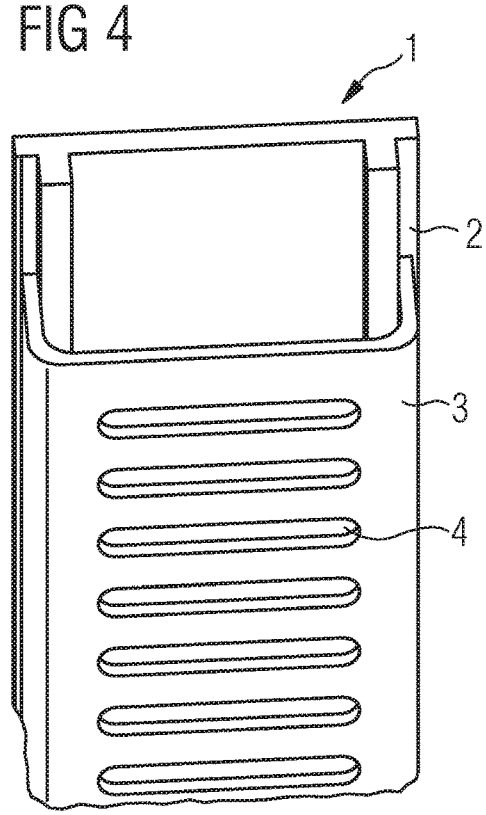
FIGS. 4, 5 illustrate two possible embodiments of a hybrid busbar according to the first aspect of the present invention.
Figure 5:
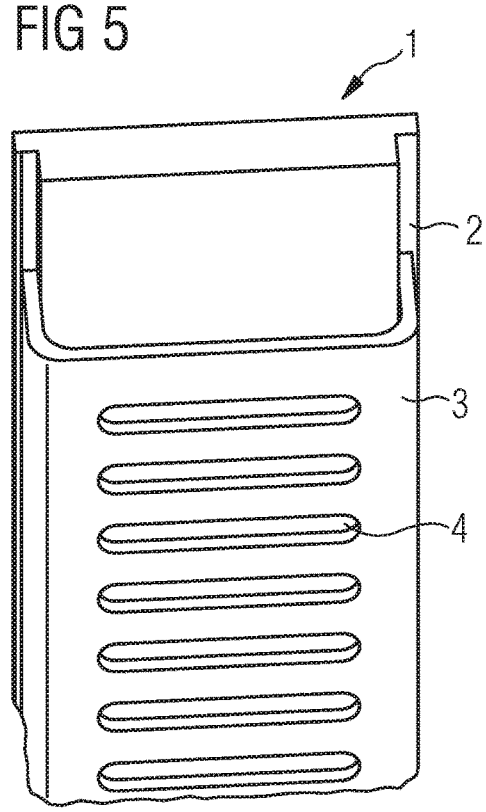

FIGS. 4, 5 show two possible embodiments of the hybrid busbar 1 according to the first aspect of the present invention. FIGS. 4, 5 show possible embodiments of the hybrid busbar 1 from the front side. In both embodiments illustrated in FIGS. 4, 5, the contact receiving rail profile 3 is U-shaped and pressed on a contact receiving rail profile 3. The contact receiving rail profile 3 of FIG. 4 has two parallel protrusions which allow pressing the contact receiving rail profile 3 on the current carrying rail profile 2. As can be seen in FIGS. 4, 5, the contact receiving rail profile 3 comprises a plurality of equidistant or equally spaced contact slots 4 which provide the possibility to attach electrical devices ED-4 such as illustrated in FIG. 2 to the busbar system. In the embodiment illustrated in FIG. 5, the current carrying rail profile 2 has the same envelope cross section CS as the current carrying profile 2 illustrated in the embodiment of FIG. 4 but has a greater physical cross section to carry the electrical current. The two embodiments of a hybrid busbar 1 as illustrated in FIGS. 4, 5 are both normally used for electrical currents I with relatively small amplitudes A. The embodiment illustrated in FIG. 5 is configured to carry electrical currents I with a slightly higher amplitude A than the electrical current I which can be carried by the hybrid busbar 1 of FIG. 4.

FIGS. 6, 7, 8 show further possible embodiments of the hybrid busbar 1 according to the first aspect of the present invention. In the embodiments illustrated in FIGS. 6, 7, the contact receiving rail profile 3 has a flat shape. In contrast, the contact receiving rail profile 3 of the embodiment of FIG. 8 is U-shaped. In the embodiment illustrated in FIG. 7, the current carrying rail profile 2 comprises a groove 8 to insert the flat contact receiving rail profile 3. In a possible embodiment, the current carrying rail profile 2 in the embodiment of FIG. 7 can be replaced according to the use case. The current carrying rail profiles 2 of the different embodiments shown in FIGS. 6, 7, 8 all comprise a C-shaped front profile 2A and one or more T-shaped profile sections 2B. The C-shaped front profile 2A is electrically and mechanically connected to the contact receiving rail profile 3 as shown in FIGS. 6, 7, 8. In the embodiment of FIG. 6, the current carrying rail profile 2 comprises a C-shaped profile section 2A integrally attached to a T-shaped profile section 2B. The same applies to the embodiment shown in FIG. 7. Further, in the embodiment of FIG. 7 a C-shaped profile section 2A of the current carrying rail profile 2 comprises a groove 8 which allows inserting a flat contact receiving rail profile 3. In the embodiment of FIG. 6, a flat contact receiving rail profile 3 can be pressed into a cross section of the C-shaped profile section 2A. In the embodiment illustrated in FIG. 8, the hybrid busbar 1 comprises a U-formed contact receiving rail profile 3 which is pressed into the C-shaped profile section 2A of the current carrying rail profile 2. In the embodiment illustrated in FIG. 8, the current carrying rail profile 2 comprises more than one T-shaped profile sections 2B to increase the cross section of the current carrying rail profile 2 and to allow electrical currents with an even higher amplitude A, e.g. of up to 5000 A. Depending on the length of the hook-shaped mounting latches 7 as illustrated in FIG. 3, the different T-shaped profile cross sections 2B allow to connect electrical devices ED-B with different kinds of hook-shaped mounting latches. A first kind of electrical device ED-B having a hook-shaped mounting latch 7 may engage the C-shaped profile section 2A from behind having a height H1 or may engage the first T-shaped profile section 2B with a height H2 or alternatively, the second T-shaped profile section 2B' with a height H3. In a possible embodiment, the electrical device ED-B can even comprise a hook-shaped mounting latch 7 allowing to engage one or more of the C-shaped and T-shaped profile sections from behind to increase mechanical stability of the system. Accordingly, a very heavy electrical device ED-B can comprise a hook-shaped mounting latch 7 which allows to engage not only one rectangular cross section CS of the hybrid busbar 1 but several rectangular envelope cross sections, i.e. it may engage the C-shaped cross section 2A, the T-shaped cross section 2B and the other T-shaped cross section 2B' from behind at the same time.

FIG. 9 shows a further exemplary embodiment of a hybrid busbar 1 according to the first aspect of the present invention. In the illustrated exemplary embodiment of FIG. 9, several T-shaped profile elements 2B, 23 are stacked on each other forming a fitting current cross section to carry an electrical current I with a predefined high current amplitude A. In the exemplary implementation shown in FIG. 9, the current carrying rail profile 2 comprises three current carrying rail profile elements 2A, 2B, 2B' stacked on top of each other to provide a huge cross section for high electrical currents I. The front C-shaped profile cross section 2A has in the illustrated exemplary implementation a T-shaped protrusion 9A which can be inserted into a corresponding receiving cross section 10B of a T-shaped second current carrying rail profile element 2B. The T-shaped current carrying rail profile element 2B comprises itself a T-shaped protruding section 9B which can be inserted into a corresponding receiving groove 10B' of the current carrying rail profile element 2B'. The embodiment illustrated in FIG. 9 has the advantage that according to the use case and the necessity of the busbar system, the cross section of the current carrying rail profile 2 can be easily adapted by exchanging different current carrying rail profile elements and by stacking a number of current carrying rail profiles 2A, 2B, 2B' . . . until the cross section of the current carrying rail profile 2 is sufficient for the respective system. Accordingly, the hybrid busbar 1 as illustrated in FIG. 9 is very flexible and can be adapted to the respective busbar system increasing the number of current carrying rail profile elements or reducing the number of current carrying rail profile elements stacked on top of each other.

In a further possible embodiment (not illustrated), a contact receiving rail profile 3 can also be attached to the bottom side of the current carrying rail profile 2. This embodiment allows to attach electrical devices on both sides to the same hybrid busbar 1.

FIGS. 10, 11, 12 show further exemplary embodiments of a hybrid busbar 1 according to the first aspect of the present invention. In the embodiments illustrated in FIGS. 10, 11, the contact receiving rail profile 3 is flat. In the embodiment illustrated in FIG. 12, the contact receiving rail profile 3 and the current carrying rail profile 2 are both U-shaped and pressed into the receiving shape of the current carrying rail profile 2. In the embodiment illustrated in FIG. 10, a flat contact receiving rail profile 3 is attached to a corresponding receiving section of the current carrying rail profile 2, i.e. by welding, in particular laser welding. In the embodiment illustrated in FIG. 11, a flat contact receiving rail profile 3 is inserted into the groove 8 of the current carrying rail profile 2. Accordingly, the embodiment illustrated in FIG. 11 has the advantage that the contact receiving rail profile 3 can be replaced easily by moving it out of the groove 8. In this embodiment, it is possible to replace the contact receiving rail profile 3 easily. For instance, a first contact receiving rail profile 3 having rectangular contact slots 4 as shown in FIG. 11 may be replaced by a flat contact receiving rail profile 3 having equally spaced contact openings 4 of a different shape such as quadratic contact openings and/or round contact openings 4. In the illustrated embodiments of FIGS. 10, 11, 12, the current carrying rail profile 2 is configured to carry currents I with a comparatively small current amplitude A.

A current carrying rail profile 2 can comprise along its length a groove 8 into which a contact receiving rail profile 3 can be inserted and attached. Equally spaced contact openings of the current carrying rail profile 3 can be formed between protruding portions or sections of the contact receiving rail profile 3. The contact receiving rail profile 3 may comprise a plurality of protruding rectangular blocks defining spacings in-between into which protruding electrical contact 6 of an electrical device ED-A such as shown in FIG. 2 can be inserted.

Figure 13:
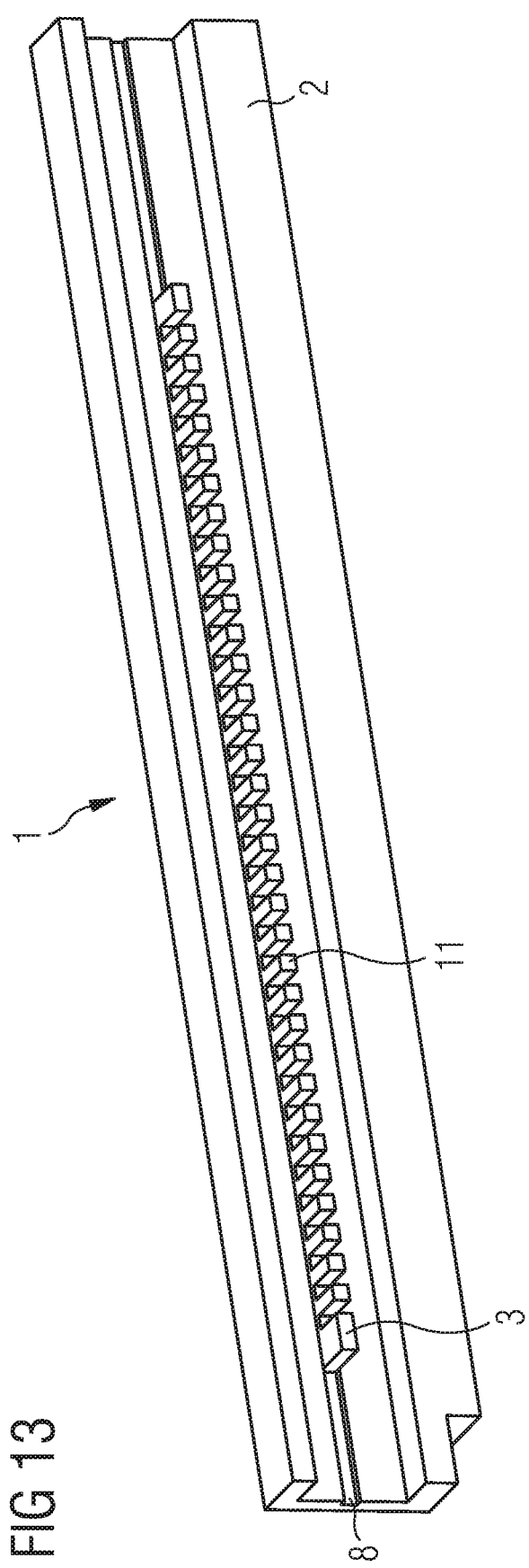
FIG. 13 shows a further exemplary embodiment of a hybrid busbar according to the first aspect of the present invention.

FIG. 13 shows a further exemplary embodiment of a hybrid busbar 1 according to the first aspect of the present invention. As can be seen in FIG. 13, the hybrid busbar 1 comprises a current carrying rail profile 2 with a relatively small cross section for small currents I and has a groove 8 for inserting a contact receiving rail profile 3 with protruding rectangular blocks 11 defining spacings 12 for receiving protruding electrical contacts such as electrical contacts 6 of an electrical device ED-A as shown in FIG. 2.

In the embodiments illustrated in FIG. 13, the current carrying rail profile 2 comprises a single groove 8 for receiving a single contact receiving rail profile 3. In a further possible embodiment, the current carrying rail profile 2 may comprise several grooves 8 for receiving a corresponding number of contact receiving rail profiles 3 having protruding blocks 11 with receiving spacings 12 for electrical contacts 6 of electrical devices ED.

Figure 14:
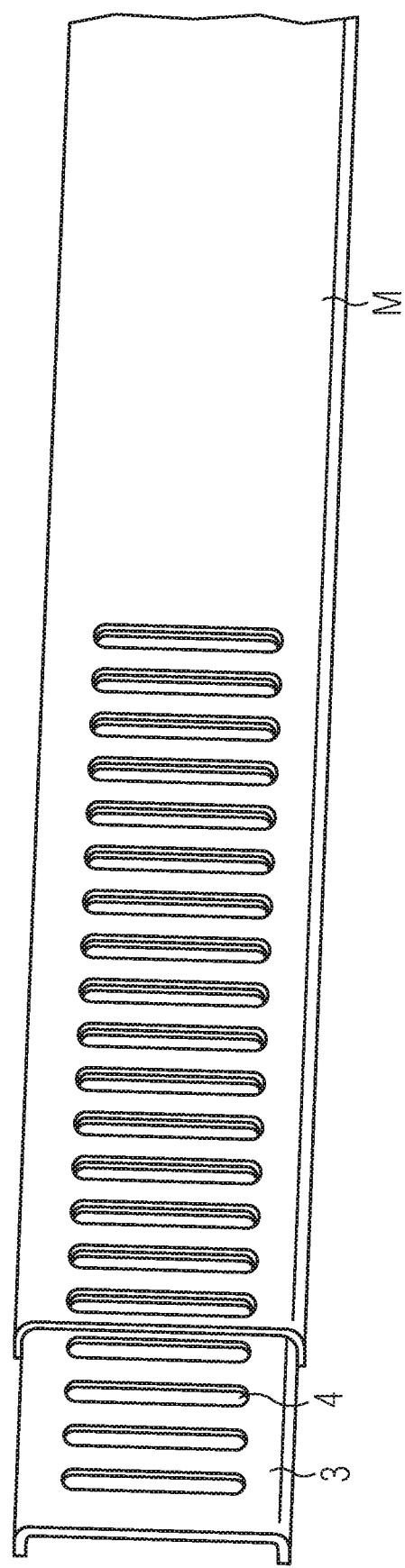
FIG. 14 shows an exemplary embodiment of a current carrying rail profile which can be used in a hybrid busbar according to the first aspect of the present invention, wherein the current carrying rail profile is at least partially coated with an electrical isolating material.

FIG. 14 illustrates a further possible embodiment of a hybrid busbar 1 according to the first aspect of the present invention. FIG. 14 illustrates a possible embodiment of a contact receiving rail profile 3 having a plurality of equally spaced contact openings 4. In the illustrated embodiment of FIG. 14, the contact receiving rail profile 3 is at least partially covered with an electrical isolating material, for instance plastic material M. In the illustrated embodiment of FIG. 14, a first section of the contact receiving rail profile 3 is not covered by the electrical isolating layer M and another section of the contact receiving rail profile 3 is completely covered by an electric isolating layer made of electric isolating material such as plastic material M. The electric isolating layer can be applied to the contact receiving rail profile 3. For instance, the equally spaced contact openings or slots 4 are punched into the contact receiving rail profile 3 of the hybrid busbar 1. FIG. 14 shows a contact receiving rail profile 3 with a covering isolating material M from the front side. The isolation can also be provided by separate isolating elements attached to the hybrid busbar 1.

The contact receiving rail profile 3 can in at least one section be completely isolated by a surrounding electric isolating layer made of an electric isolating material M. It is also possible that the contact receiving rail profile 3 is only covered on the front side with an electric isolating layer made of an isolating material M but not isolated on the rear side. In the embodiment illustrated in FIG. 14 the contact receiving rail profile 3 is U-shaped. In a still further possible embodiment, the contact receiving rail profile 3 can also be formed flat where the front side and/or back side of the flat contact receiving rail profile 3 is covered with an electric isolating layer made of an electric isolating and fire-resistant material M.

Figure 15:
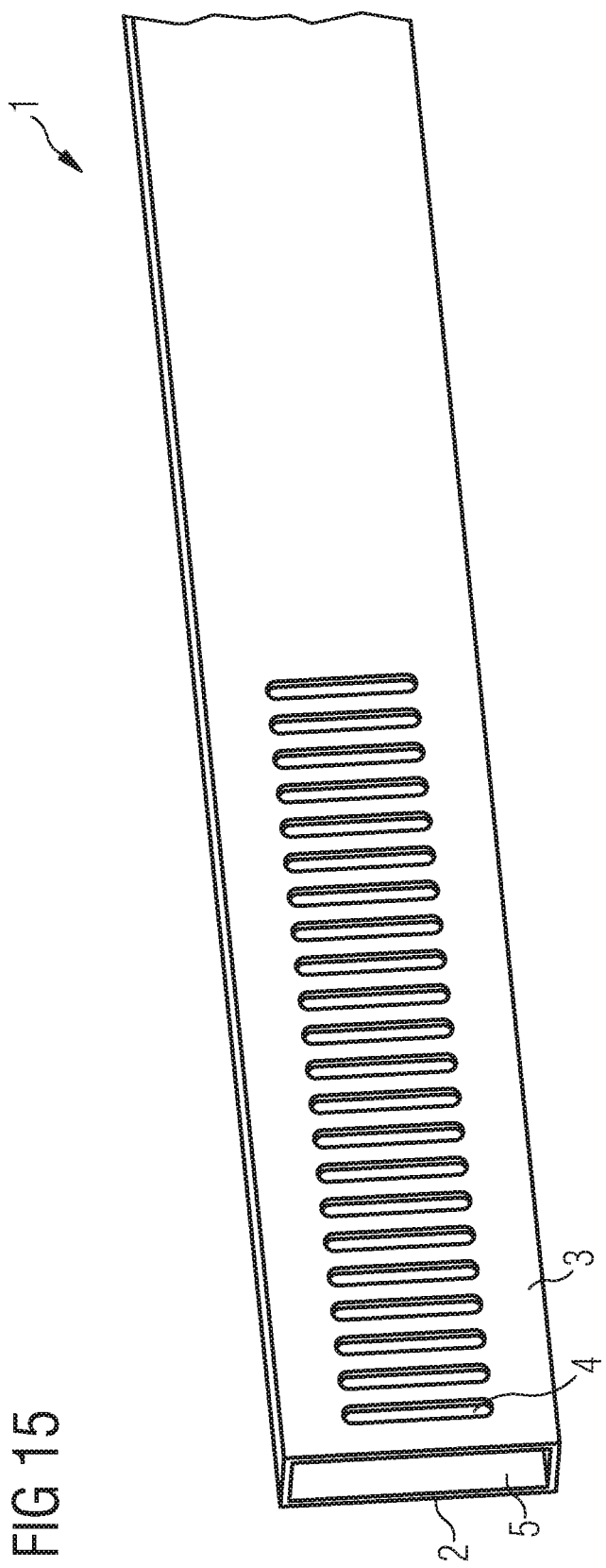
FIG. 15 shows schematically a further exemplary embodiment of a hybrid busbar according to the first aspect of the present invention.

FIG. 15 shows a still further possible embodiment of a hybrid busbar 1 according to the first aspect of the present invention. In the illustrated embodiment, the hybrid busbar 1 is produced by a roll forming of its shape where both ends of the roll-formed shape are welded together to form an empty space or contact receiving chamber 5 for protruding electrical contacts 6. On the front side of the hybrid busbar 1, equally spaced contact openings 4 are provided. Accordingly, in the embodiment illustrated in FIG. 15, the hybrid busbar 1 comprises a contact receiving rail profile 3 formed by the front side and a current carrying rail profile 2 formed by the rear side of the roll-formed element.

Figure 16:
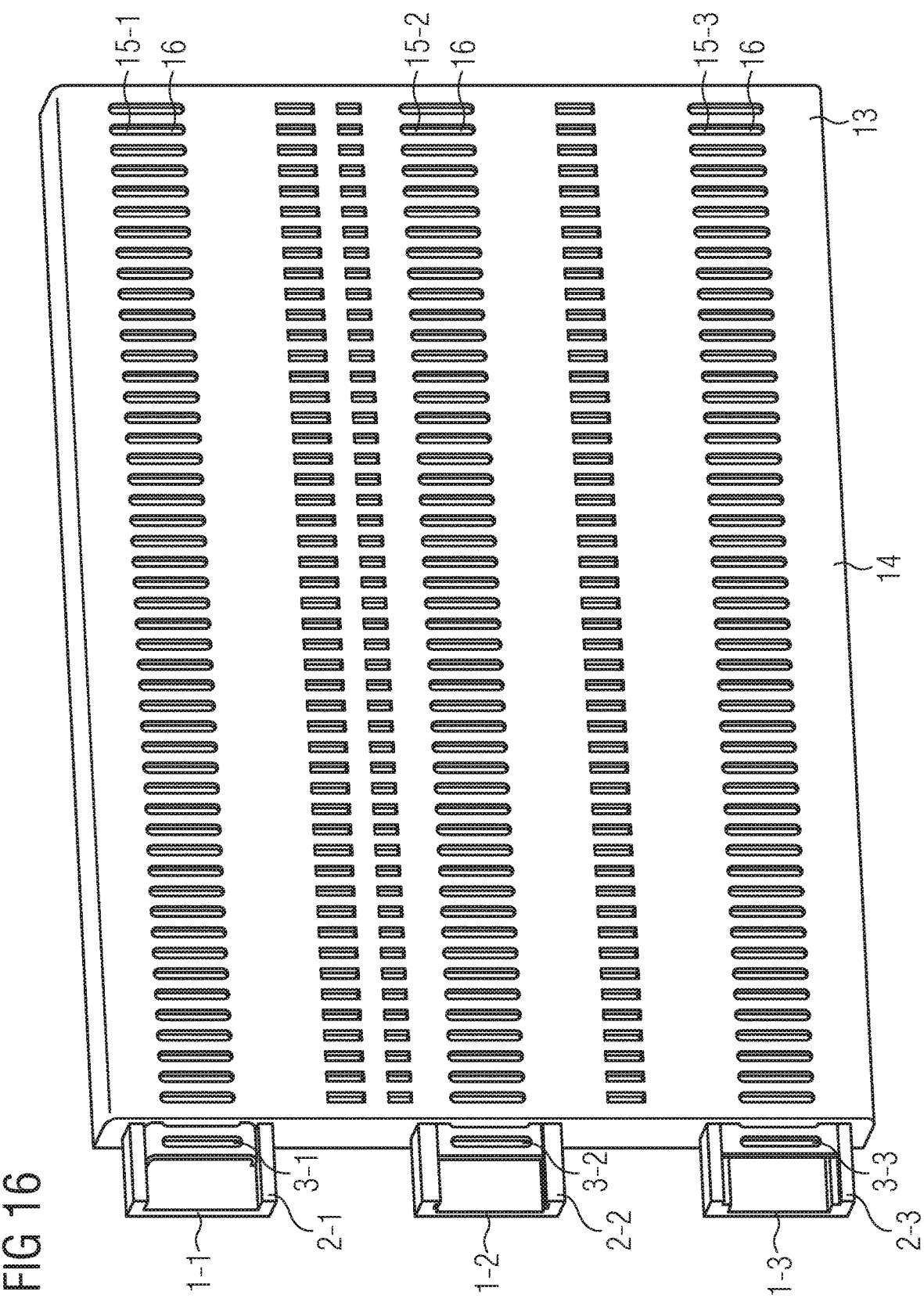
FIG. 16 shows a possible exemplary embodiment of an electrical isolating module according to the second aspect of the present invention.

FIG. 16 shows a possible exemplary embodiment of an electric isolating module or isolating unit for a busbar system according to a further aspect of the present invention. In the illustrated embodiment, the electrical isolating unit 13 is adapted to receive three hybrid busbars 1-1, 1-2, 1-3 according to the first aspect of the present invention. In the illustrated embodiment of FIG. 16, the three hybrid busbars 1-1, 1-2, 1-3 each comprise a current carrying rail profile 2-1, 2-2, 2-3 and an associated contact receiving rail profile 3-1-, 3-2, 3-3. The electric isolating cross board 13 comprises a front section 14 having a corresponding number of rows 15-1, 15-2, 15-3 of equally spaced contact openings 16 which are aligned with the equally spaced contact openings 4 of the contact receiving rail profiles 3-i of the hybrid busbars 1-1, 1-2, 1-3. In the illustrated exemplary embodiment of FIG. 16, the electrical isolating cross board unit 13 comprises three rows 15-1, 15-2, 15-3 wherein each row comprises a plurality of equally spaced contact openings 16 which are aligned with the equally spaced contact openings 4 of the contact receiving rail profiles 3-i of the hybrid busbars 1-i. The isolating unit 13 shown in FIG. 16 is made of an electrical isolating material and can protect a user efficiently against high electrical currents I and/or high electrical voltages. Electrical devices ED such as electrical devices ED-A as illustrated in FIG. 2 can be attached to the electrical isolating module 13 by inserting their electrical contacts 6 first through the contact openings 16 of the front cover or front section 14 of the isolating module 13 and then through the aligned contact openings 4 of the contact receiving rail profiles 3-i lying directly beneath the contact openings 16.

Figure 17:
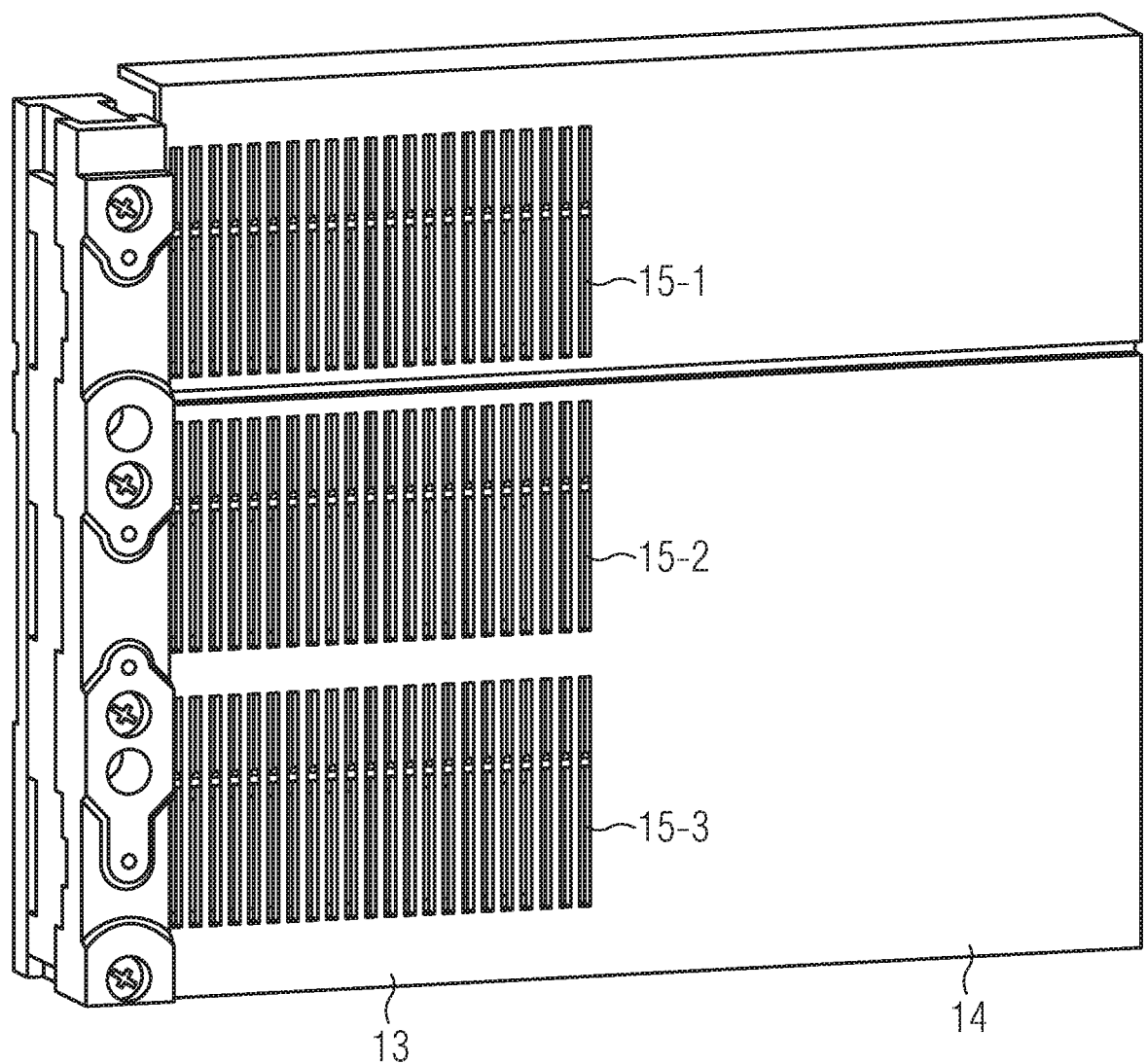
FIG. 17 shows a further view on an electrical isolating module according to the second aspect of the present invention.

FIG. 17 shows a further view on an electrical isolating cross board unit 13 according to the second aspect of the present invention. In the illustrated embodiment of FIG. 17, the different rows 15-i of the equally spaced contact openings 16 do not cover the complete front cover of the isolating unit 13. The number of hybrid busbars 1 which are enclosed by the electrical isolating unit 13 can vary depending on the system and use case. In the illustrated embodiments of FIGS. 10, 17, the electrical isolating unit 13 is configured to receive and enclose three hybrid busbars 1 according to the first aspect of the present invention.

The rectangular envelope cross sections CS of the hybrid busbars 1 are formed such that they correspond in their dimensions, i.e. height H and width W, to conventional busbars. Accordingly, the hybrid busbars 1 can be easily used to replace existing conventional busbars 1 of a busbar system. In a possible embodiment, a busbar system can even comprise a mix of normal conventional busbars and hybrid busbars 1 according to the first aspect of the present invention.

Figure 18:
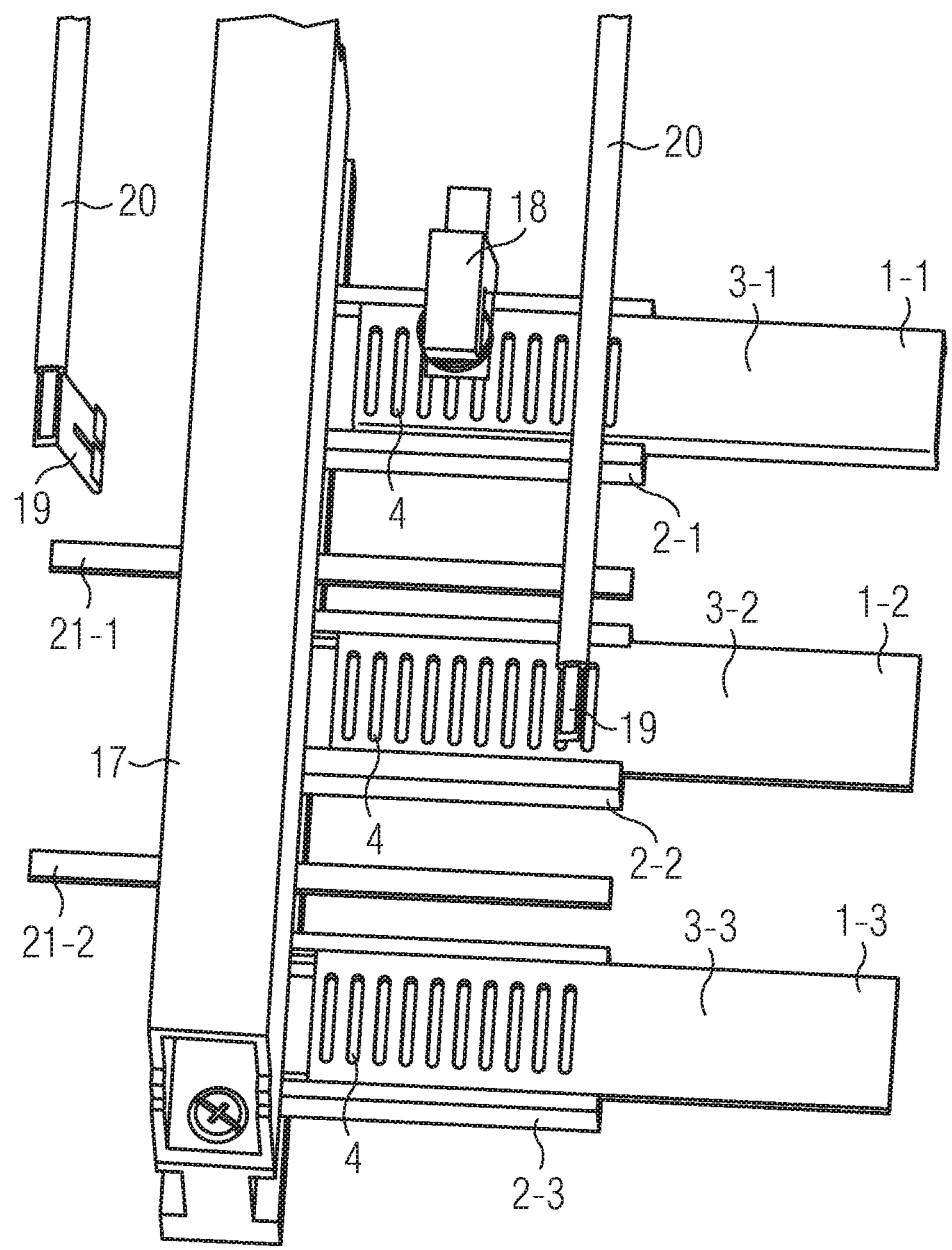
FIG. 18 shows schematically a possible exemplary embodiment of an electrical isolating module according to the second aspect of the present invention comprising internal hybrid busbars according to the first aspect of the present invention.

FIG. 18 shows schematically the internal structure of an electrical isolating unit 13 according to the second aspect of the present invention. In the illustrated embodiment of FIG. 18, the electrical isolating unit 13 can comprise an element 17 to carry the hybrid busbars 1-1, 1-2, 1-3 each consisting of a current carrying rail profile 2-1, 2-2, 2-3 and an attached contact receiving rail profile 3-1, 3-2, 3-3. The different flat contact receiving rail profiles 3-1, 3-2, 3-3 comprise at least partially sections with a plurality of equally spaced contact openings 4 as shown in FIG. 18.

The busbar carrying element 17 can for instance be attached to a mounting plate of an electric control cabinet. Clamping brackets 18 as illustrated in the embodiment of FIG. 18 can be used to contact the hybrid busbars 1. These clamping brackets 18 are designed to be inserted through the contact openings 16 of the electrical isolating unit 13 and to engage with equally spaced contact openings 4 of the contact receiving rail profile 3-i of the hybrid busbar 1. The electrical isolating unit 13 can internally also comprise engaging traversing rails 21-1, 21-2 which can be used for mechanical engaging elements of the electrical devices ED attached to the unit 13, especially to mechanically fixed electrical devices ED having a high weight. The electrical isolating unit 13 may surround the included hybrid busbars 1 completely. In an alternative embodiment, the electrical isolating unit 13 comprises only an electrical isolating front section 14 with several rows 15 each comprising a plurality of equally spaced contact openings 16. In a possible embodiment, the electrical isolating unit 13 is adapted to receive hybrid busbars 1 according to the first aspect of the present invention and at the same time conventional busbars having corresponding cross sections. The busbars are normally extending in horizontal direction when mounted in the unit 13. Electrical devices can also be connected by means of electrical cables 20 having electrical contacts 19 inserted through slots 16 into slots 4.

Figure 19A:
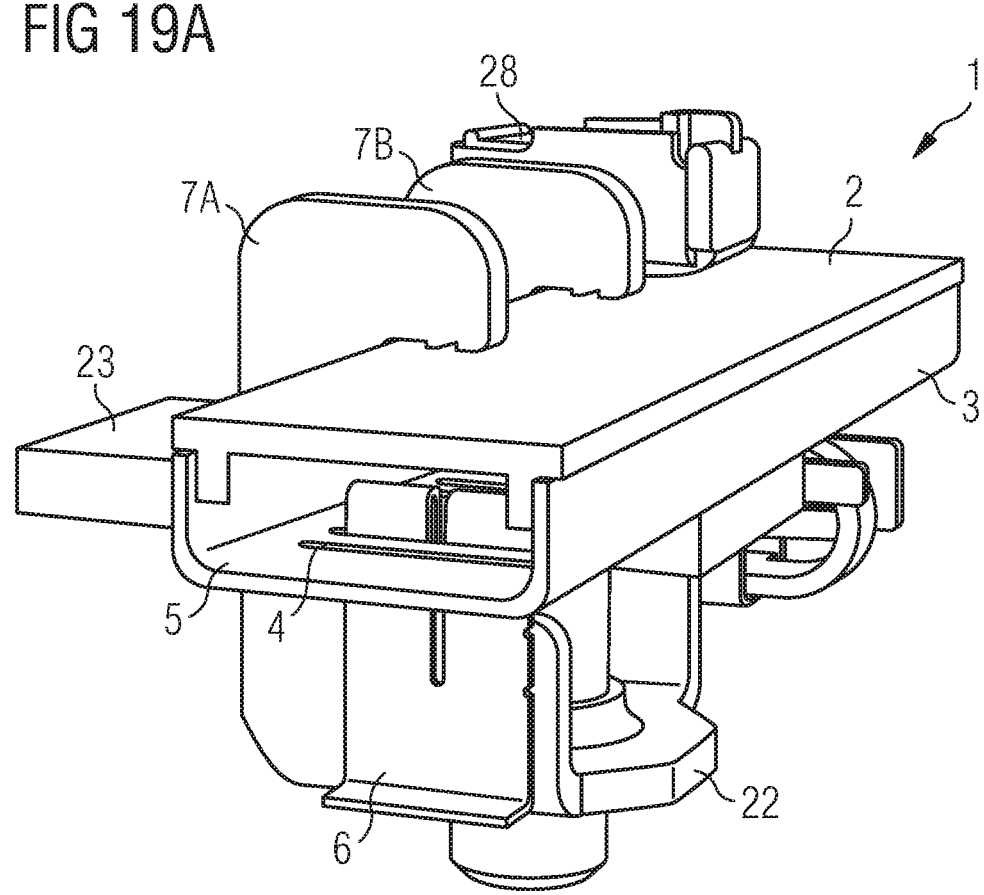
Figure 19B:
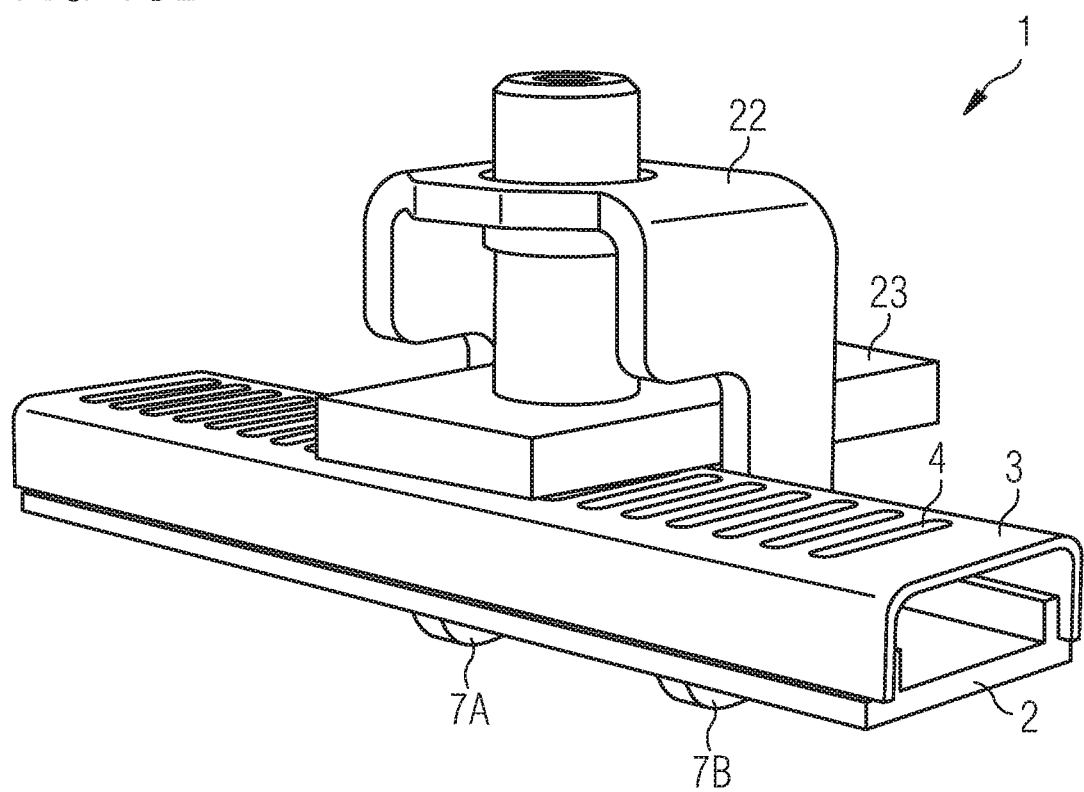

FIGS. 19A, 19B, 19C show hook-shaped mounting latches 7A, 7B engaging the current carrying rail profile 2 of the hybrid busbar 1 from behind. In the illustrated example of FIGS. 19A, 19B, the mounting latches 7A, 7B form part of a clamping unit 22 including a screw or threaded pin used for attaching a current carrying rail 23 to the hybrid busbar 1. FIG. 19A shows an electrical contact 6 of an electric device inserted into a slot 4 of the contact receiving rail profile 3 of the hybrid busbar 1. Also an electrical contact 19 of an electrical cable 20 can be inserted into such a slot 4 of the contact receiving rail profile 3.

As can be seen in FIG. 19C, the hybrid busbar 1 can also be contacted by means of a clamp element 28 having a spring element 29 adapted to press a current carrying rail 30 against a surface of the hybrid busbar 1, i.e. against the contact receiving rail profile 3 as illustrated in FIG. 19C or against the current carrying rail profile 2 to establish a mechanical and electrical connection with the hybrid busbar 1.

FIG. 20 shows an embodiment where the contact receiving rail profile 3 is connected to the current carrying rail profile 2 by means of a mechanical connection element 24 using an intermediate distance element 25 made out of an electrically conductive material positioned between the contact receiving profile 3 and the current carrying rail profile 2. The mechanical connection element 24 comprises a first portion 24A and a second portion 24B having a receiving groove to receive the hybrid busbar 1. The receiving groove has a height H and a width W defining a rectangular cross section corresponding to the bounding geometry with the rectangular cross section CS of the hybrid busbar 1. The height $H_d$ of the distance element 25 depends on the height $h_3$, $h_2$ of the contact receiving rail profile 3 and the current carrying rail profile 2 respectively ($h_d+h_2+h_3=H$).

The intermediate distance element 25 can be a separate exchangeable element or attached to either the contact receiving rail profile 3 or the current carrying rail profile 2. Screws 26, 27 can be used to fix the upper portion 24A to the lower portion 24B of the mechanical connection element 24 which may slightly press the contact receiving rail profile 3 via the intermediate distance element 25 on the current carrying rail profile 2. In an alternative embodiment, the contact receiving rail profile 3 is fixed to the current carrying rail profile 2 by other mechanical connection means including screws, bolts or clinch elements.

In a further possible embodiment, the hybrid busbar 1 can comprise besides the contact receiving rail profile 3 and the current carrying rail profile 2 a data transmission rail profile element extending in parallel with the contact receiving rail profile 3 and the current carrying rail profile 2. The data transmission rail profile can be used for data transfer of data signals between electrical devices ED having contact 6 inserted into slots 4 of the contact receiving rail profile 3 and/or by electrical devices ED engaging the current carrying rail profile 2 by means of hook-shaped latches 7. In an alternative embodiment, the communication of data transfer can take place by PLC via the hybrid busbar 1, i.e. via the current carrying rail profile 2 and/or via the contact receiving rail profile 3.

Different embodiments of the hybrid busbar 1 according to the present invention as illustrated in the different figures can be combined with each other.

REFERENCE SIGNS 1 hybrid busbar
2 current carrying rail profile
3 contact receiving rail profile
4 contact openings
5 contact receiving chamber
6 electrical contacts
7, 7A, 7B mounting latches
8 groove
9A, 9B protrusions
10A, 10B receiving grooves
11 protruding blocks
12 contact receiving spacings
13 cross board
14 front cover
15 contact slot row
16 slots
17 busbar carrying element
18 clamping bracket
19 electrical contact
20 electrical cable
21 traversing rails
22 clamping unit
23 current carrying rail
24 mechanical connection element
25 intermediate
26, 27 screws
28 clamp element
29 spring element
30 current carrying rail

The invention claimed is:

1. A hybrid busbar for a busbar system, said hybrid busbar comprising:
    a current carrying rail profile adapted to carry an electrical current with a predefined high current amplitude and
    at least one contact receiving rail profile having a plurality of equally spaced contact openings configured to receive protruding electrical contacts of electrical devices to be connected to said busbar system;
    wherein the current carrying rail profile and said at least one contact receiving rail profile are connected with each other to form said hybrid busbar which is engageable from behind by hook-shaped mounting latches of said electrical devices to be connected to said busbar system.

2. The hybrid busbar according to claim 1, wherein the current carrying rail profile comprises a rail profile made of copper, aluminum aluminium or a multi-component material.

3. The hybrid busbar according to claim 1, wherein each of said at least one contact receiving rail profile is made of copper, tin-coated copper, silver-coated copper, and/or brass.

4. The hybrid busbar according to claim 1, wherein the contact openings of said at least one contact receiving rail profile comprise different shapes including rectangular contact slots, quadratic contact openings and round contact openings.

5. The hybrid busbar according to claim 1, wherein said at least one contact receiving rail profile is U-shaped or flat.

6. The hybrid busbar according to claim 1, wherein said at least one contact receiving rail profile is connected to the current carrying rail profile by a force-fit connection to form the hybrid busbar providing a bounding geometry with a rectangular cross section.

7. The hybrid busbar according to claim 1, wherein said at least one contact receiving rail profile is connected to the current carrying rail profile by a materially bonded connection to form said hybrid busbar providing a bounding geometry with a rectangular cross section.

8. The hybrid busbar according to claim 1, wherein said at least one contact receiving rail profile is connected to the current carrying rail profile by one or more mechanical connection elements.

9. The hybrid busbar according to claim 1, wherein current carrying rail profile comprises at least one groove to insert one of said at least one contact receiving rail profile into the current carrying rail profile to form said hybrid busbar.

10. The hybrid busbar according to claim 1, wherein the cross section of said current carrying rail profile is configured to carry an alternating or direct current with a predefined high current amplitude of up to 5000 A.

11. The hybrid busbar according to claim 1, further comprising a busbar data transmission element attached to said current carrying rail profile and/or to said at least one contact receiving rail profile used for data transfer of data and connectable by electrical devices for exchanging data between the electrical devices and/or external data processing devices.

12. The hybrid busbar according to claim 1, wherein the hybrid busbar comprises at least one bounding geometry with a rectangular cross section engageable by said hook-shaped mounting latches of said electrical devices to be connected to said busbar system.

13. The hybrid busbar according to claim 12, wherein the bounding geometry with a rectangular cross section has a width between 12 mm and 30 mm and a height, of 5 mm or 10 mm.

14. The hybrid busbar according to claim 1, wherein said at least one contact receiving rail profile and/or the current carrying rail profile are at least partially covered with an electrical isolating layer.

15. The hybrid busbar according to claim 14, wherein said electrical isolating layer comprises plastic material.

16. The hybrid busbar according to claim 1, wherein the current carrying rail profile comprises a C-shaped profile (2A) and one or more T-shaped profiles.

17. The hybrid busbar according to claim 16, wherein the current carrying rail profile comprises several T-shaped profile elements stacked on each other forming a fitting current cross section to carry the electrical current with the predefined high current amplitude.

18. An electrical isolating unit for a busbar system comprising a front section having equally spaced second contact openings aligned with said plurality of equally spaced contact openings of said at least one contact receiving rail profile profiles forming part of a hybrid busbar enclosed by said electrical isolating unit;
the hybrid busbar comprising:
a current carrying rail profile adapted to carry an electrical current with a predefined high current amplitude and
at least one contact receiving rail profile having a plurality of equally spaced contact openings configured to receive protruding electrical contacts of electrical devices to be connected to said busbar system;
wherein the current carrying rail profile and said at least one contact receiving rail profile are connected with each other to form said hybrid busbar which is engageable from behind by hook-shaped mounting latches of said electrical devices to be connected to said busbar system.

* * * * *